Sept. 30, 1958     M. P. McLEAN     2,853,968
APPARATUS FOR SHIPPING FREIGHT

Filed Aug. 26, 1954     6 Sheets-Sheet 1

Sept. 30, 1958 M. P. McLEAN 2,853,968
APPARATUS FOR SHIPPING FREIGHT
Filed Aug. 26, 1954 6 Sheets-Sheet 4

Sept. 30, 1958    M. P. McLEAN    2,853,968
APPARATUS FOR SHIPPING FREIGHT
Filed Aug. 26, 1954    6 Sheets-Sheet 5

Sept. 30, 1958  M. P. McLEAN  2,853,968
APPARATUS FOR SHIPPING FREIGHT
Filed Aug. 26, 1954  6 Sheets-Sheet 6
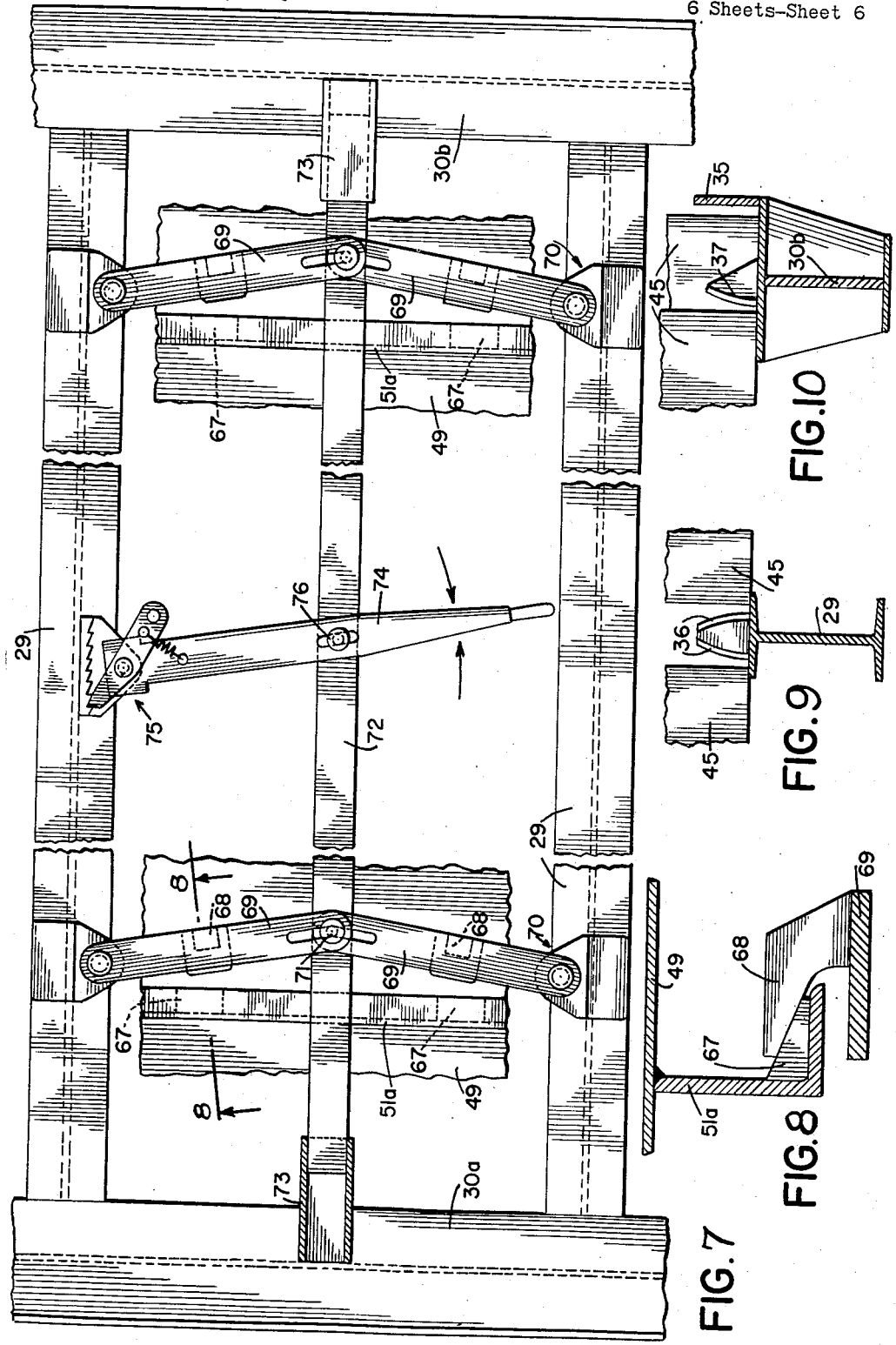

United States Patent Office

2,853,968
Patented Sept. 30, 1958

2,853,968

APPARATUS FOR SHIPPING FREIGHT

Malcolm P. McLean, Winston-Salem, N. C.

Application August 26, 1954, Serial No. 452,325

4 Claims. (Cl. 114—72)

My present invention relates to water-borne freight movements and more particularly to a means for stowing cargo aboard an otherwise single purpose vessel whereby the pay load of such vessels may be greatly augmented without materially detracting from the primary load carrying capabilities of the vessel.

There are several types of vessels which have customarily been built and intended for use in carrying a narrowly limited category of cargo which is usually moved in bulk. Such vessels are provided with holds designed especially to receive such cargo and consequently are not suitable for handling other types of cargo. This may be readily appreciated from a consideration of one such type of vessel commonly designated as a "tanker" which is particularly well suited for the purposes of this invention and in connection with which this invention is especially advantageous. There are a large number of tankers in service which transport liquid in bulk. Such vessels are unsuited for carrying any other type of cargo and, as in the case of the petroleum industry, may be limited to carrying a specific type of liquid such as oil. Even from a cursory examination of shipping routes and the flow of cargo thereover it is apparent that tankers move their primary or normal cargo in only one direction over any given route between a loading port and an unloading port and make the return trip without any pay load. Furthermore, since the vessel cannot safely navigate open water without sufficient load, ballast usually in the form of water is pumped into the hold. Thus, the turn-around time of the vessel at the port when its cargo is discharged must necessarily include time for taking on at least part of such ballast. On arrival at the port where cargo is to be loaded time is also consumed in discharging at least that part of the ballast which could not be removed as the vessel approached its port.

In spite of the fact that such single purpose vessels are built and purchased at a substantial cost, their earning or income producing capabilities are seriously curtailed since, to the cost of transporting each pay load, there must be added the extra cost of returning the vessel empty to pick up its next load. Such economic and other burdens have long been imposed upon these vessels and, from time to time, there have been attempts made to alleviate this situation. Generally, as for example in the case of tankers, they involved loading general cargo directly on the main or weather deck of the ship. By general cargo is meant any cargo other than that normally carried by a single purpose vessel. Such methods of augmenting the ship's capabilities have proven to be unsatisfactory for various reasons. The weather deck of tank ships affords only an extremely limited amount of space for the storage of additional cargo which space must also of necessity accommodate the additional equipment necessary for securing the cargo. Even if the additional cargo were destined for the ship's port of call it would under normal circumstances not discharge such additional cargo at the oil receiving or loading dock since such docks are not equipped for the handling of general cargo. Because of the small volume of the additional cargo not enough revenue would be involved to warrant the additional expense resulting from moving the ship to another dock for handling the general cargo. Of course, it is apparent then that the costs involved would also prohibit the taking on of such additional cargo intended for a port at which the vessel would not otherwise put in.

In addition to having only limited free space available due to the presence of pipes, hatches and other necessary fixtures and equipment, the weather deck of present day tankers is situated so close to the waterline of the laden ship as to leave an exceedingly small amount of freeboard thereby making the weather deck an extremely hazardous place for stowing cargo. In a time of extreme emergency when shipping space was critically needed expedients were attempted to raise the cargo above the exposed weather deck to provide additional freeboard for the cargo. While less of a risk in the case of a vessel plying inland waterways, the losses sustained due to damage and pilferage as well as other disadvantages increased the cost of such service to an extent which precluded successful operations.

Under present day conditions with the large number of single purpose vessels in service there are a number of routes over which such vessel may set out as often as about once a week. At the same time general cargo may be held at dockside for as long as a month or more before being put aboard a general cargo freighter even though the cargo may be intended for a port on or easily accessible from the route of a tanker or other single purpose vessel several of which in the interim may have departed empty of a payload from the home port of the waiting cargo. Intercontinental shipments may often take six to eight weeks for delivery thereby substantially adding to the cost and difficulty of financing such operations.

I have found that not only may all of the abnormal risk and loss heretofore involved in the carrying of additional cargo aboard such single purpose ships be eliminated but that a large volume of space apart from the normal cargo space may be provided for expeditiously and economically handling cargo without in any way interfering with the loading and unloading of primary cargo or the customary handling of the vessel.

It is, therefore, a principal object of my invention to provide an apparatus especially well suited for loading additional cargo on a tanker above the main or weather deck thereof which provides a maximum amount of security against damage and loss from pilferage, which does not require that any departure be made from the usual procedures for handling the vessel or its normal cargo, and which makes possible expeditious and highly economic handling of both the additional cargo and the normal cargo.

A major impediment to transoceanic trade resides in the relatively high cost involved in moving a small shipment of merchandise from a consignor to a consignee. Such merchandise may be handled as many as ten or more times due to the number of loading, unloading and storing operations involved, and the cost of labor as well as the time involved are major factors in determining the cost of moving the shipment. At the same time losses due to damage, pilferage and other causes are substantial, the risk involved increasing with the number of times the goods must be handled or transshipped. While it has heretofore been proposed to move truck-trailer bodies loaded with cargo between two land points by ship, the construction of conventional trailer bodies is inadequate to withstand the forces and corrosive substances to which they would be exposed on the weather deck of a vessel. In particular, the weather deck of a tanker is unsuitable for transporting such trailer bodies.

Another important object of my invention is to provide an apparatus for transporting a plurality of truck-trailer bodies, each loaded with a pay load, above the weather deck of a normally single purpose ship which apparatus is especially suited for use in conjunction with a tank ship, and which substantially increases the income earning capabilities of such ships.

Another object is to provide such an apparatus which in addition to enhancing the capabilities of heretofore single purpose vessels also provides an advantageous means for water-borne transportation of relatively small unit shipments.

Yet another object is to provide an apparatus for loading additional freight above the hull and main deck of a tank ship shipment thereon in a position exposed to the external atmosphere and the elements.

A further object is to provide an apparatus for trans-shipping freight while in a truck-trailer body on a tank ship in a position above the main deck thereof exposed to the external atmosphere while leaving the ship free to receive and transport its primary cargo in its hull.

In accordance with my invention there is provided a structure well above the main or weather deck of a tank ship and adapted for expeditiously loading and securing thereon a plurality of containers arranged in rows extending lengthwise of the vessel. An open framework construction supported by the weather deck and the vessel's girders and having horizontally disposed girder members forming a raised network substantially coextensive with the weather deck is provided. An array of container seats extending uninterrupted from the forecastle deck to the poop deck is made possible by erecting the usual amidships house or bridge structure on the forecastle deck and as far forward as may be consistent with good ship design practices.

The containers are of sturdy construction capable of withstanding the forces to be encountered on the open seas and are adapted to receive the freight to be transported. In a specific, and particularly advantageous, embodiment of my invention, hereafter more specifically described, each container may be of a construction adapted to receive a complete truck-trailer fully loaded with freight.

The construction is such that two rows of containers are formed. Preferably, the containers of one row are in side by side relation with each other and in end to end relation with the adjacent containers of the other row. Thus, the long sides of the containers are protected from direct impact from high seas by adjoining containers and in the case of the four end containers their outer sides are protected by the forecastle or poop deck structure as the case may be.

In practice, the truck-trailer bodies may each be loaded at widely separated points any or all of which may be many miles inland. Once loaded the trailers may be sealed at the point of origin and thereafter the cargo need not be disturbed until the seals are broken at the final destination. The trailers are routed to convenient ports of embarkation where they are each secured in a container. In certain instances a tank ship will receive a full load of containers at a port where it is to take on or discharge its normal cargo. In order to take advantage of the time which would otherwise be lost in discharging ballast preparatory to taking on the normal cargo or in taking on ballast after discharging normal cargo, the containers are preferably loaded at that time. That is to say, when a ship arrives at the port where it is to discharge both its normal cargo and the additional cargo in the containers the ship is first moved to the dock equipped for the discharge of its normal cargo. After this has been accomplished the ship starts taking on its sea water ballast and while this is carried on it is moved to a dock equipped to unload the inbound containers and reload with outbound containers. Land based cranes may conveniently be used for moving the containers and the arrangement is such as to facilitate the simultaneous use of two or more cranes. On completion of the loading operation the ship is ready to start its voyage. On the other hand, when a ship arrives at the port where, before it is to take on its normal cargo, it must complete discharging its ballast, the ship is first brought to a dock for discharging and/or loading the containers of additional cargo. After this operation, at which time all excess ballast will have been discharged, the ship is in readiness to be moved to the location for taking on its normal cargo.

Because of the ease and rapidity with which truck-trailer bodies may be moved into or out of the containers those which arrive aboard ship loaded with trailers may be removed from the ship, set on the dock, unloaded, reloaded with a trailer containing outbound cargo and then replaced aboard ship on the cargo deck where it may quickly be locked in place.

From the foregoing it is apparent that my invention is especially well suited for substantially augmenting the present limited capabilities of such a single purpose vessel as a tank ship and a preferred embodiment thereof adapted for such use will now be described in detail, reference being had to the accompanying drawings in which:

Figure 7 is a view of one container seat as viewed from below and showing the latching means;

Figure 6:
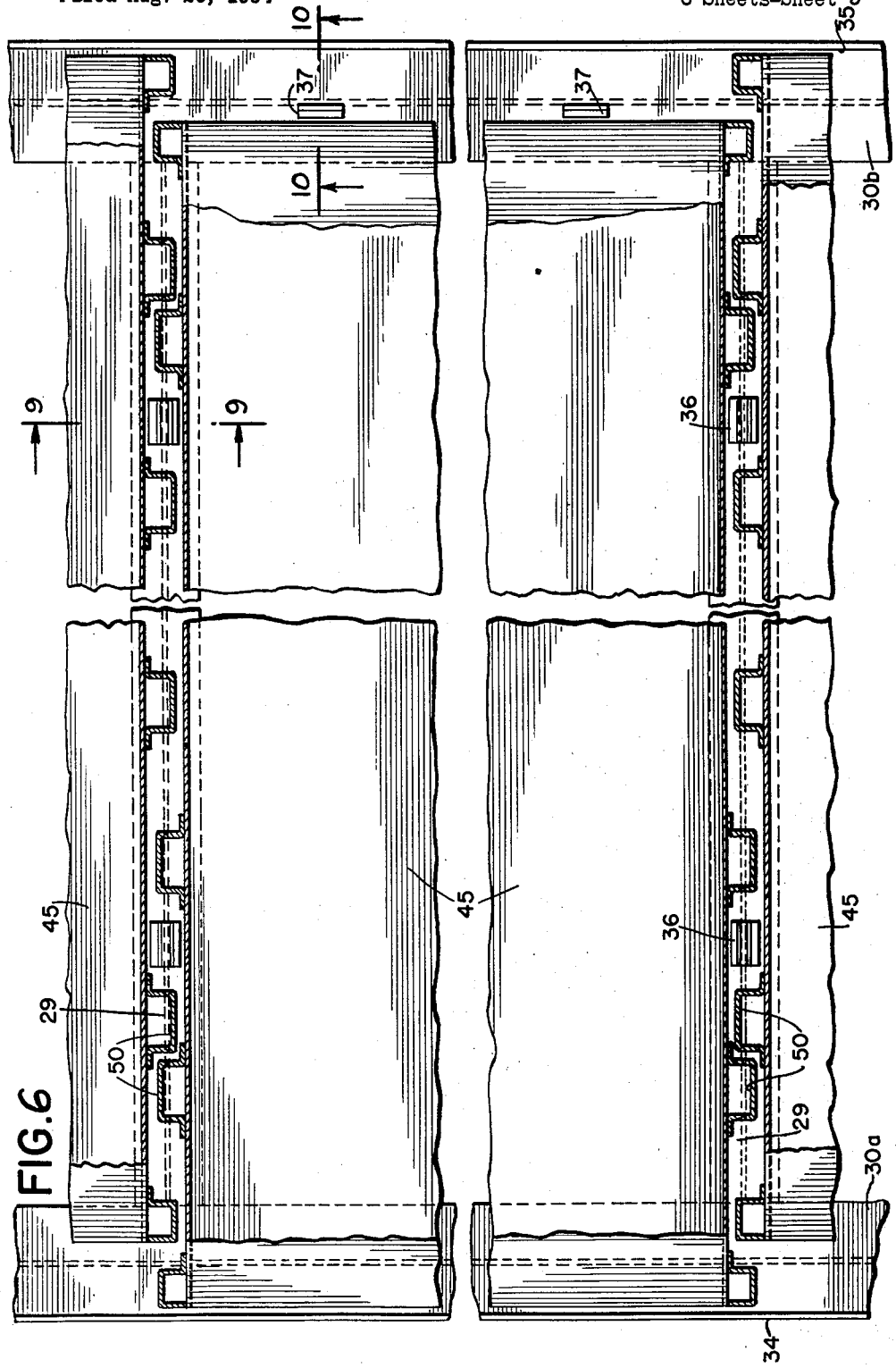
Figure 6 is a plan view partially in section showing the relationship of three adjoining containers when mounted and broken away for convenience.

Figure 8 is a sectional view along the line 8—8 of Figure 7, showing a detail of the latch means; and Figures 9 and 10 are sectional views along the lines 9—9 and 10—10, respectively, of Figure 6.

Referring now to the drawings in detail, tank ship 20 has forecastle and poop decks 21, 22. The usual house structure 23 and accommodations are provided on poop deck 22. On the after end of the forecastle deck 21 there is located a house and navigation bridge structure 24 which as shown is located as far forward as possible. This arrangement provides a continuous expanse of main deck 25 which extends aft from forecastle deck 21 to poop deck 22. The normal cargo holds 38 extend and occupy substantially the entire space below deck 25, the latter in effect forming a cover for the normal or liquid cargo. Deck 25 normally forms the upper deck of such vessels and in accordance with established practices the usual oil hatches 26, cargo oil deck lines 27, as well as other equipments are located thereon.

Figure 1:
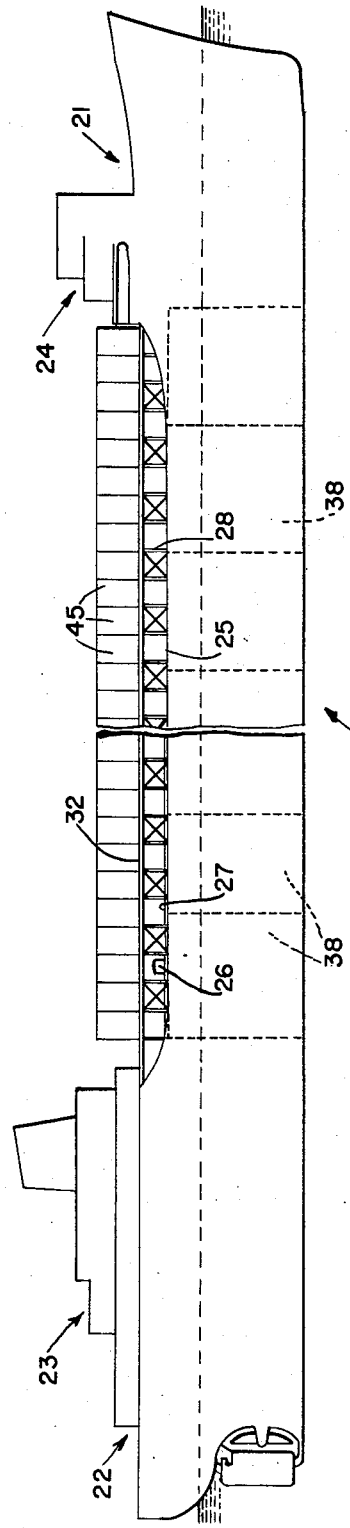
Figure 1 is a side elevational view of a tank ship constructed in accordance with this invention, partially broken away for convenience and with the cargo containers mounted on their seats.
Figure 2:
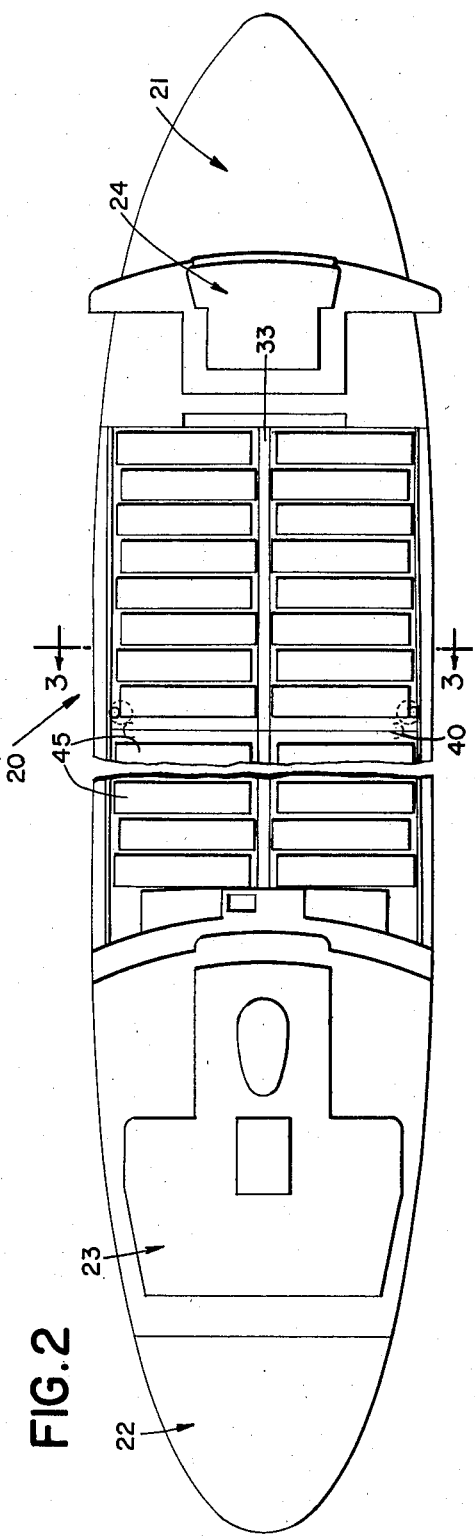
Figure 2 is a top plan view thereof.
Figure 3:
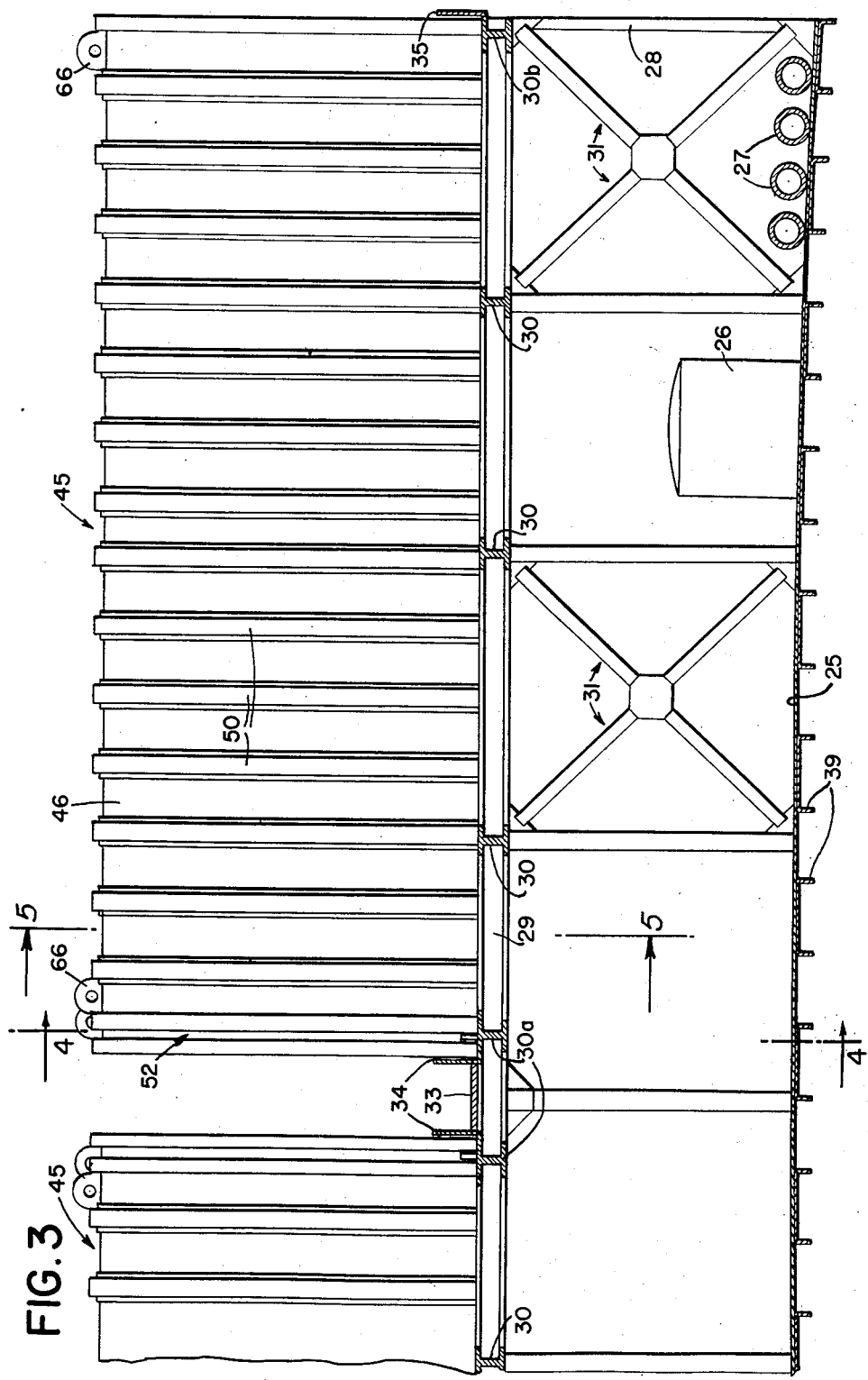
Figure 3 is a fragmentary sectional view through the line 3—3 of Figure 2 drawn on a larger scale.
Figure 4:
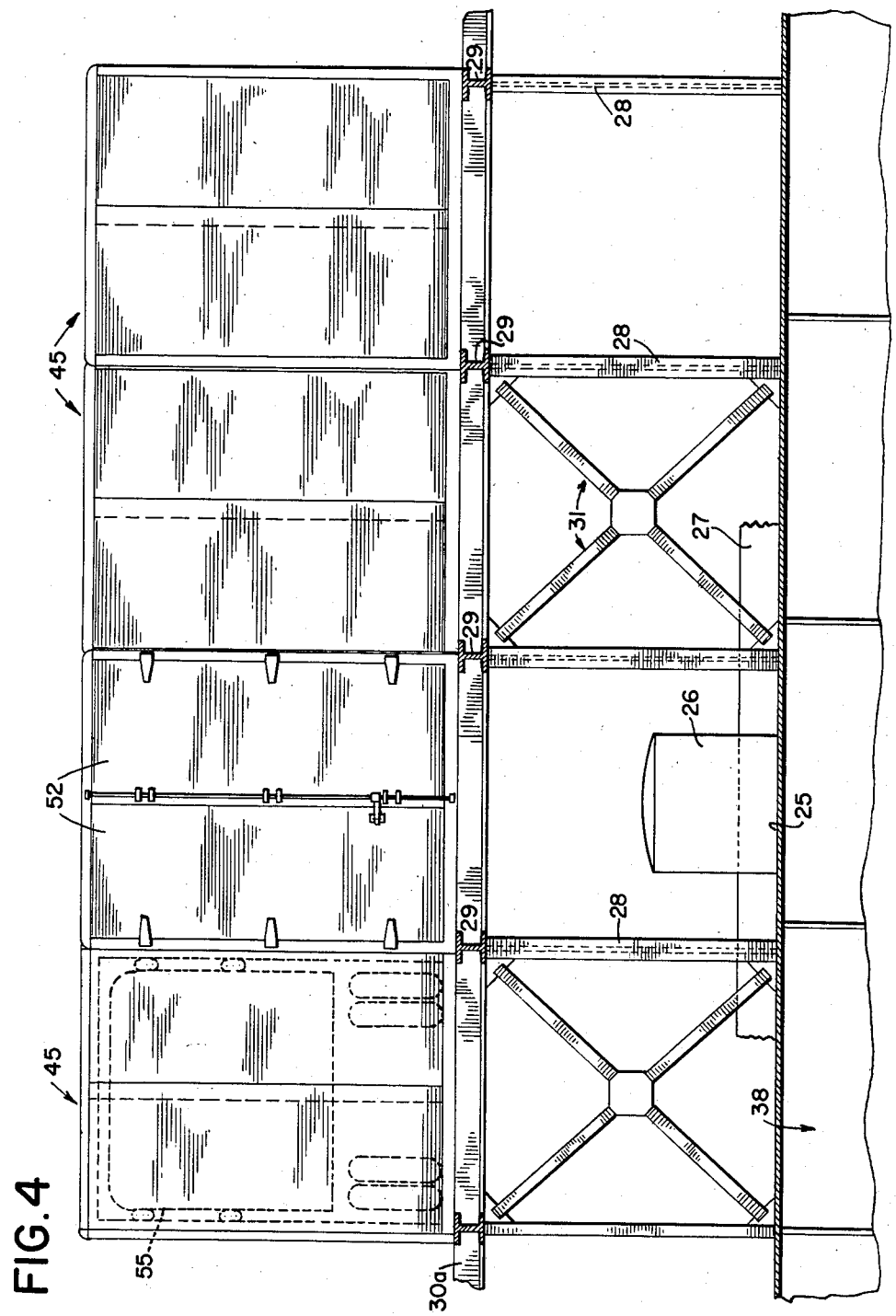
Figure 4 is a similar view through the line 4—4 of Figure 3.
Figure 5:
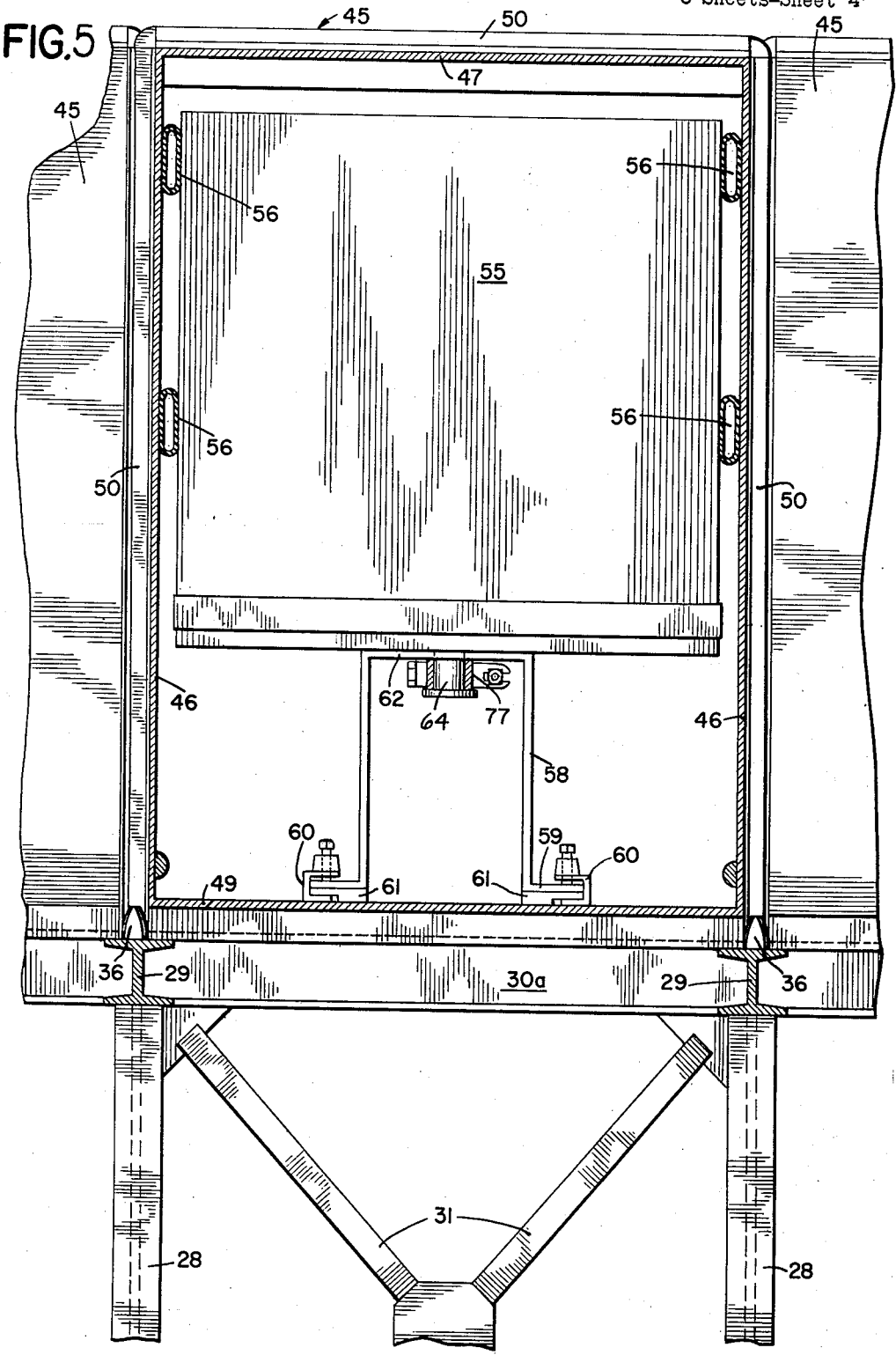
Figure 5 is a sectional view along the line 5—5 of Figure 3 taken in the direction indicated.

Erected on weather or upper deck 25 are a plurality of stanchions 28 spaced so as to support transverse or thwartships girder members 29 and longitudinal or fore and aft girder members 30. In the present instance thwartships girder members 29 are substantially uniformly spaced from each other at intervals of approximately 9 feet. Stanchions 28 may be correspondingly spaced both longitudinally and transversely thereby providing a plurality of stanchions directly below each girder member 29. Furthermore, alternate pairs of stanchions may be braced by truss members 31 as indicated. This arrangement of stanchions 28 and truss members 31 provides a structure capable of supporting the weight of an array of an open network of girder members 29 and 30, forming the seating surfaces or surface means 32, and the weight of the loaded cargo containers which together may weigh 3,000 tons in the case of a ship having a length of about 600 feet between perpendiculars and a beam of about 85 feet. As most clearly shown in Figure 3, a substantial number of the stanchions 28 are located so as to register with ship's fore and aft girder members 39. In keeping with the length of the framework structure one or more expansion joints 40 may be provided, as indicated schematically in Figure 2, one such joint being between a pair of adjacent thwartships girder members 29.

Seats 32 extend substantially on a level with both the forecastle and poop decks to provide the usual midships walkway 33 along either side of which fore and aft girder members 30a extend. Inboard curb members 34 extend along girder members 30a paralleling walkway 33 while a similar curb member 35 is provided along outboard fore and aft girder members 30b one of which is most clearly shown in Figure 3. Positioned at intervals along the upwardly presented surface of each of the transverse girder members 29 are guide members 36 (Figures 6 and 9) while guide members 37 are positioned alternately along the associated inboard and outboard longitudinal girder members 30a and 30b in the intervals between transverse girder members 29. The various curb members 34, 35 and guide members 36, 37 serve to locate the containers on each of the seats 32.

Containers 45 are dimensioned to be received on seats 32 formed by girder members 29 and 30 between guide members 36 located on adjacent girder members 29 and between guide members 37 and one of the curb members 34 or 35 as the case may be. Containers 45 comprise sheet metal side walls 46, top 47, rear wall 48 and base 49 preferably welded together and to stiffener members 50. Stiffener members 50 may be hat shaped as shown and may extend along the outer surface of both side walls 46 and top wall 47. Container base 49 is also provided with rigidifying members and in this instance such members are angle members spaced along and welded to its under surface. The front end of each container 45 is provided with doors 52 which are hingeably mounted on frame members 53 and are provided with a suitable locking device as indicated. To insure that the contents of containers 45 are properly protected against the possibility of spoilage or damage, the containers are preferably constructed so that they are substantially water and airtight and doors 52 are provided with suitable sealing gaskets which extend peripherally about the doors as well as along the break between the doors. In certain instances, as in the case when the freight may require refrigeration, air vents properly shielded to prevent admission of water, or other undesirable substances, may be utilized.

One advantage of the foregoing container structure resides in the fact that the interior thereof is free of obstructions which might interfere with the loading of a trailer therein or might cause damage thereto. While various factors subject to variation may determine the overall dimensions of containers 45, it is presently contemplated that they may be approximately 36 feet in length in order to accommodate a conventional wheeled trailer body 55. However, I preferably construct the containers so that they have substantially uniform width or seating surfaces of substantially uniform width. Means are provided for securing trailer 55 in place in container 45 which preferably may readily be snugly engaged with the trailer body after it is inserted into its container without interfering with the loading operation. It is highly desirable that this be accomplished without necessitating the removal of the wheels from the trailer or requiring the provisions of special jacks or the like. I therefore, preferably mount along the interior of side walls 46 expansible securing means such as inflatable members 56 provided with valve stems 57 or other suitable filling and venting means. Suitable bumper means may also be provided along other interior surfaces of containers 45 such as top 47, rear wall 48 and doors 52.

Inflatable members 56 are deflated at the time trailer 55 is to be loaded into or unloaded from container 45. When a trailer 55 has been properly positioned within a container 45 inflatable members 56 are connected to a source of air under pressure and inflated so as to engage the sides and rear of the trailer body. The large area interface between the trailer and inflatable members insures strong gripping engagement therebetween, while the relatively small pressure exerted on a unit area of the trailer minimizes the possibility of damage thereto.

The front end of trailer 55 is supported in container 45 by means of a pedestal 58 having outwardly extending flanges 59 providing a base therefor which may readily be secured by means of dogs 60 to rails 61 connected to base 49. Supporting surface 62 of pedestal 58 has an open ended slot to receive kingpin 64 of trailer 55 and has a split collar 77 depending therefrom for retaining the kingpin. The bumper members cooperate with pedestal 58 in preventing forward or rearward movement of the trailer. When trailer body 55 is to be inserted into its container, a fork-lift truck having a pedestal 58 seated on its forks may be used to support the front end of the trailer body.

Containers 45 are lifted by means of D-rings 66 suitably mounted at each of the four corners of its roof and when set in position on its seat 32 is readily locked in place. The means for securing containers 45 in place are preferably a quick connect-disconnect coupling and may include wedge-shaped members 67 mounted in alined spaced relation on predetermined angle members 51 below container base 49 and designated 51a in Figures 10 and 11. Positioned to engage each of the wedge-shaped members 67 is a complimentarily shaped hold-down member 68 secured to pivot bars 69 two of which are associated with each of the angle members 51a. As shown in Figure 10, the sets of pivot bars 69 extend between adjacent transverse girders 29 and at their remote ends are pivotally secured to the girders as indicated at 70. The adjacent ends of pivot bars 69 are slotted to receive a lug 71 which serves to movably secure pivot bars 69 to an elongated actuator member 72 extending between inboard and outboard girder members 30a, 30b. Each of the actuator members 72 extending longitudinally below each container seat 32 is slideably secured to girder members 30a, 30b by means of sleeves 73. An elongated lever 74, provided for each actuator member 72, is pivotally secured at one end to one of the transverse girder members 29 as at 75 where a ratchet type latching means may be provided to secure lever 74 in its engaged position. Lever 74 extends across actuator member 72 and is slotted to receive a lug 76 fixed to actuator member 72. With container 45 in place, wedge-shaped members 67 are located as indicated in Figure 10. When lever 74 is rotated clockwise, as viewed, pivot bars 69 are each moved to the left to engage hold-down members 68 with wedge-shaped members 67 thereby securing container 45. To free containers 45 it is only necessary to unlatch levers 74 and rotate in the opposite direction thereby disengaging hold-down members 68.

By locating stiffener members 50 on the outer surfaces of containers 45 the desired structural strength is provided to accommodate the 30,000 pounds or more of load to be placed therein while at the same time insuring economy of materials and space. In particular, a significant saving in space is obtained when adjacent containers are seated in offset relation one to the other and with their sidewall stiffener members 50 substantially in nested relation as shown.

When, as in the present instance, containers 45 are to be transported on petroleum tank ships, I preferably construct the containers of spark proof metals such as aluminum or alloys thereof. Use of such light weight metals makes possible exceedingly strong containers having minimum weight. An important advantage of containers 45 is that truck-trailer bodies 45 need only to be moved into the containers and require no special treatment to protect them and their running gear from the deleterious salts to which they would otherwise be exposed during the course of a sea voyage. When delivered at the port of destination the trailers are immediately ready on being coupled to a prime mover for their overland journey. Furthermore, even though such trailers are constructed so as to keep their dead weight to a minimum in view of load weight restrictions on highways it is not necessary to change their design so as to make them strong enough to withstand such forces as the weight of high seas since the containers completely enclose and protect them, providing dry storage over the entire voyage. It should also be noted that the elevated location of seats 32 above main deck 25 provides additional freeboard for the containers over the relatively small freeboard, approximately seven feet, normally available so that the overall freeboard on vessel 10 may be about fourteen to sixteen feet or more.

The substantial uniformity of containers 45 facilitates establishment and adherence to standard loading and unloading procedures for handling the containers in a rapid and efficient manner. For example, stands for containers 45 may be prepared at dockside which facilitate insertion or removal of trailers 55. Such stands may be in the form of a shallow pit deep enough to receive container base rigidifying members 51 but leaving doors 52 free to open or close and placing the container floor sufficiently close to ground level to facilitate insertion of the trailers. The positions at which trailers 55 are inserted into containers 45 are preferably located adjacent land-based movable cranes of the type conventionally utilized in hoisting loads and positioning them aboard a ship.

Combined overland and overwater movements of relatively small unit quantities of freight between a consignor and consignee are not only feasible but may now be carried out in a highly profitable manner. Unit shipments in trailer-load quantities are particularly suited for handling in an expeditious low cost manner. It is also contemplated that even smaller unit shipments may be now practical since a given truck-trailer may be used to pick up less than trailer-load quantities at several separated points and intended for delivery through the same ports. Also, it would not be necessary that such less-than-trailer-load shipments loaded in one trailer body be destined for the same consignee since the trailer when once disembarked at its port of destination may be routed overland to several consignees.

As previously indicated, the gross weight of seats 32 with their supporting members and with the shipping packages formed by the loaded containers may be approximately 3,000 tons. This tonnage applies to such a structure adapted to hold 84 containers in two rows of 42 each and includes a pay load of approximately 1,200 tons.

A tank ship of the type corresponding to vessel 10 may carry 25,000 tons of normal cargo such as petroleum and an additional general cargo of 1,200 tons. The freight rate for general cargo is many times that for petroleum, ton for ton, consequently the vessel's earnings for a round trip carrying 25,000 tons of normal cargo and 1,200 tons of general cargo one way and another 1,200 tons of general cargo on the return trip may be almost three times the earnings from carrying 28,000 tons of oil as heretofore.

By substantially reducing and virtually eliminating the possibility of damage to the normal cargo handling equipments such as conduits, hoses and running gear normally located on its main or weather deck as well as injury to ship's personnel, the combined tank and freight ship can efficiently be utilized to handle its normal cargo as well as taking on the additional freight on the framework forming seats extending above its hull. Due to the frequency at which tank ships are regularly dispatched, costs normally associated with freight movements are substantially reduced thereby making the use of such vessels for the movement of general freight especially advantageous.

Another important advantage of the present invention resides in the fact that vessels may be readily converted for carrying general freight in addition to their normal cargo. Existing tank ships may be modified by moving the usual midship deck house and navigation bridge forward to the forecastle deck. Tank vents and boom kingposts are readily moved outboard to the sides of the ship. This leaves the space over the tank hatches and pipes free for the erection of the framework for seats 32 as previously described.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A combined bulk cargo and general freight waterborne tank ship, comprising a tank hull adapted to receive liquid cargo in bulk and including a main weather deck forming the roof of said tank hull, liquid cargo loading and discharging means extending along said deck outside and above said tank hull, support means on said tank hull and extending upwardly therefrom above said deck and said loading and discharging means, and means connected to and supported by said support means above said deck and said loading and discharging means and defining surface means for receiving general freight, said means connected to said support means having an area substantially coextensive with said main weather deck.

2. A combined bulk cargo and general freight waterborne tank ship, comprising a tank hull adapted to receive liquid cargo in bulk, said tank hull including a main weather deck exposed to the atmosphere extending along the midships portion of said tank hull and a forecastle deck extending forwardly of said main weather deck and raised thereabove, a house structure including a conning bridge on said forecastle deck, liquid cargo loading and discharging means extending along said main deck exteriorly and above said tank hull, support means on said hull extending above said main deck and said loading and discharging means, and means connected to and supported by said support means above said main weather deck and said loading and discharging means and defining surface means exposed to the atmosphere on all sides thereof for receiving general freight, said means connected to said support means having an area substantially coextensive with said main weather deck.

3. A combined bulk cargo and general freight waterborne tank ship as set forth in claim 1 wherein a plurality of substantially uniform general freight containers are supported upon said surface means.

4. A combined bulk cargo and general freight waterborne tank ship as set forth in claim 1 wherein a plurality of substantially uniform general freight containers adapted to receive a truck trailer therein are supported upon said surface means.

References Cited in the file of this patent

UNITED STATES PATENTS

| | | |
|---|---|---|
| 135,545 | Halliday | Feb. 4, 1873 |
| 982,046 | Flemming | Jan. 17, 1911 |
| 1,206,648 | Bacon | Nov. 28, 1916 |
| 1,675,957 | Reeves | July 3, 1928 |
| 2,300,259 | Kueppers | Oct. 27, 1942 |
| 2,363,797 | Lovfald | Nov. 28, 1944 |
| 2,406,084 | Levin | Aug. 20, 1946 |
| 2,440,306 | Smith | Apr. 27, 1948 |
| 2,524,260 | Hutson | Oct. 3, 1950 |
| 2,699,735 | Williams | Jan. 18, 1955 |

FOREIGN PATENTS

| | | |
|---|---|---|
| 779,670 | France | Jan. 19, 1935 |